United States Patent [19]

Murphy

[11] Patent Number: 5,435,216
[45] Date of Patent: Jul. 25, 1995

[54] METHOD AND APPARATUS FOR OPERATING A HYDRAULIC RAM

[75] Inventor: William P. Murphy, Lockport, N.Y.
[73] Assignee: Strippit, Inc., Akron, N.Y.
[21] Appl. No.: 98,108
[22] Filed: Jul. 28, 1993
[51] Int. Cl.$^6$ ............................................. B26D 5/20
[52] U.S. Cl. ........................................... 83/13; 83/36; 83/39; 83/76.1; 83/257; 83/530; 83/552; 83/639.1
[58] Field of Search .............. 83/13, 36, 49, 72, 74, 83/248, 257, 530, 552, 639.1, 39, 50, 76.1, 76.6; 100/257

[56] References Cited

U.S. PATENT DOCUMENTS

| | | | |
|---|---|---|---|
| 1,796,417 | 3/1931 | Wittek | 83/230 |
| 3,014,393 | 12/1961 | Jackson | 83/257 |
| 3,298,267 | 1/1967 | Schmid et al. | 83/530 |
| 4,116,122 | 9/1978 | Linder et al. | 83/72 X |
| 4,538,493 | 9/1985 | Perazzolo et al. | 83/530 |
| 4,658,688 | 4/1987 | Shah et al. | 83/552 |
| 4,823,658 | 4/1989 | Spicer | 83/72 X |
| 5,199,338 | 4/1993 | Schorn et al. | 83/13 |
| 5,205,149 | 4/1993 | Hayashi | 83/552 X |
| 5,299,478 | 4/1994 | Schorn et al. | 83/13 |

*Primary Examiner*—Eugenia Jones
*Attorney, Agent, or Firm*—Hill, Steadman & Simpson

[57] ABSTRACT

A method for controlling punch strokes of a punch press machine includes the step of performing a first punching operation with a punching tool wherein a sheet of material is in a first preselected position. A second punching operation is then initiated with the punching tool at a variable hover height before the sheet of material reaches a second preselected position. The variable hover height of the punching tool is determined by the distance between the first and second punching operations. If the sheet reaches a predetermined in-position zone before the punching tool reaches maximum hover height, the ram changes direction moving downward. The punch reaches the material just prior to the work piece coming to a stop thereupon performing the next punching operation.

15 Claims, 4 Drawing Sheets

METHOD AND APPARATUS FOR OPERATING A HYDRAULIC RAM

FIELD OF THE INVENTION

The present invention relates generally to a method for controlling the punch stroke of a ram for optimizing the productivity of a CNC punch press machine.

DESCRIPTION OF THE RELATED ART

In punch press machines, such as CNC punch presses, increased production efficiency has been achieved by controlling the punch stroke. Specifically, the punch stroke can be controlled by a suitable machine control, such as a microprocessor. The machine control typically responds to codes in a part program in order to alter the upstroke and downstroke speed of the ram during a punching or forming operation.

Where sophisticated controls are involved, the parameters for controlling the ram can be determined solely from the sheet thickness of a sheet, or piece part to be punched or formed. Where the ram parameters are determined solely from the sheet thickness, the ram is quickly moved to the surface of the sheet, or to a position slightly above the surface of the sheet of material to be worked. The ram is then slowed as the punch strikes and passes through the sheet to be worked, thereby performing its operation. The ram then quickly returns to a fixed position, or hover height, above the sheet to be worked as the sheet moves along the x and y axes of a table.

However, sheet materials are susceptible to warpage. Thus, the hover height of the ram must be frequently changed by a programmer to compensate for sheet warpage, particularly on longer x or y moves of the table, to prevent the punching tool from striking the sheet material. More frequently, the programmer merely selects a "safe" hover height that will clear any sheet warpage of the sheet material. Unfortunately, selecting a hover height that compensates for sheet warpage results in productivity losses, since the ram always returns to the same hover height.

SUMMARY OF THE INVENTION

It is an object of the present invention to provide a method for controlling punch strokes of a ram which overcomes the deficiencies and disadvantages of the known methods.

This and other objects are achieved in a method for controlling the punch strokes of a ram including the step of automatically adjusting the height from which the next punch stroke is initiated based on the distance a workpiece is moved.

Thus, in accordance with the principles of the present invention the motion of the ram is fully automated such that the punching operation of a punch is initiated before a workpiece arrives in a desired position, or as soon as the workpiece arrives in the desired position, rather than waiting until the punch reaches a selected hover height to initiate the punching operation.

DESCRIPTION OF THE PREFERRED EMBODIMENTS

Figure 1:
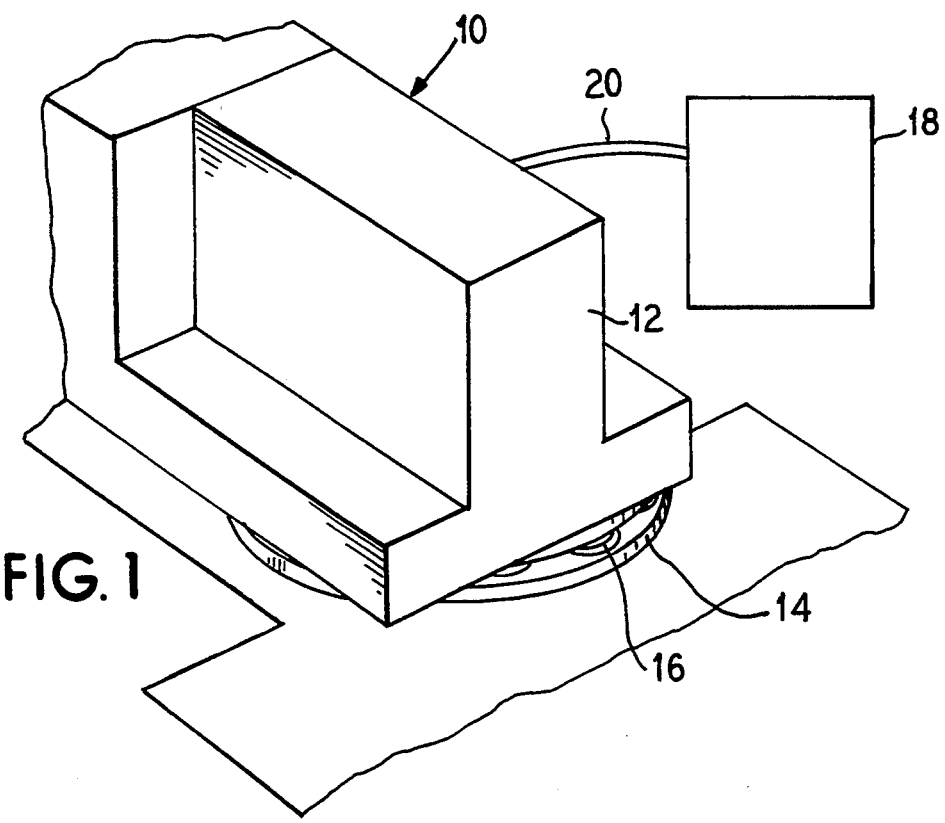
FIG. 1 is a perspective view of an upper turret portion of a device operated in accordance with the principles of the present invention.

FIG. 1 illustrates an upper turret portion of a device operated in accordance with the principles of the present invention. The device is shown generally at 10 and includes a punch press housing 12, a rotatable turret 14, at least one punching tool 16. More specifically, a ram (not shown) is disposed in the punch press housing 12 for driving a punch through a piece of sheet material and into a die. In a turret punch press of the type illustrated, a plurality of punches and dies are mounted adjacent the perimeter of the upper turret 14 and a lower turret (not shown) which are rotatable to bring corresponding punches and dies under the ram. In certain types of punch presses, at least one indexable punch tool is mounted within the rotatable upper turret 14, and a corresponding indexable die is mounted in a lower turret so that the indexable punch and the die may be brought into registration under the ram as disclosed in U.S. Pat. No. 4,658,688, incorporated herein by reference. Other types of punch presses, such as those using tool changers or other means for changing the punches and dies could be used to practice the invention disclosed herein. Operation of the punch press 10 is controlled preferably by a computer control 18 electrically connected to the punch press by wires 20.

Figure 2:
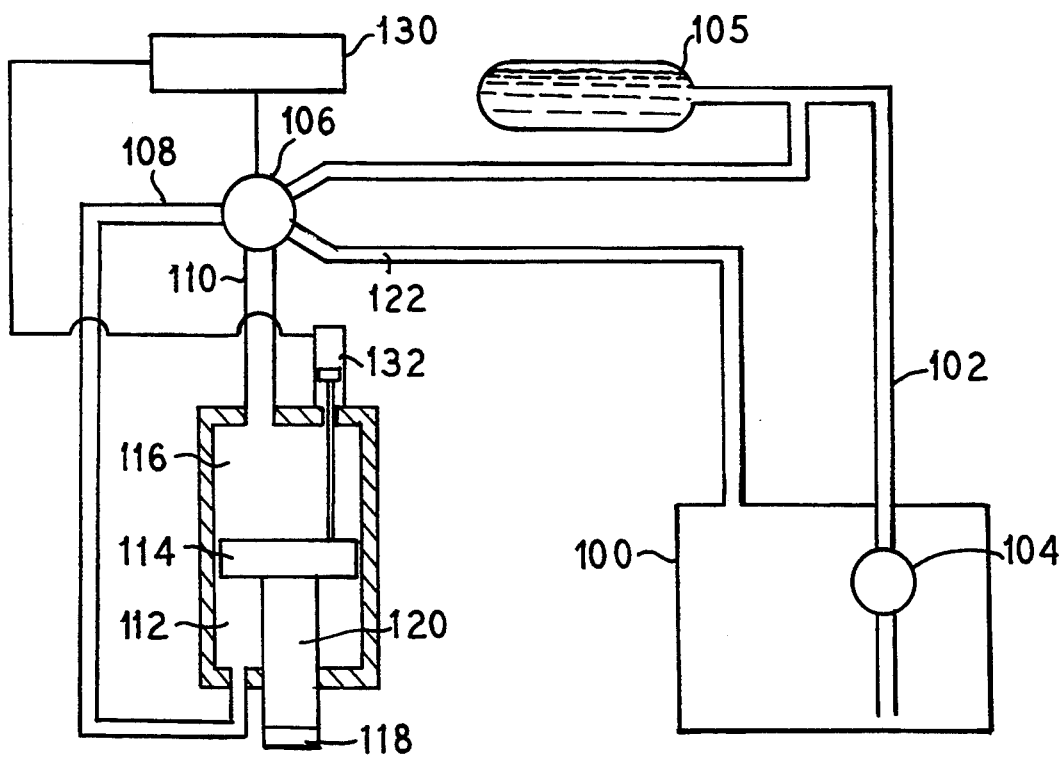
FIG. 2 is a schematic illustration of the operating components in a hydraulic ram.

FIG. 2 schematically illustrates the hydraulic system which is used in connection with the present invention. Hydraulic fluid is stored in a reservoir 100. The fluid is pumped out of the reservoir 100 through a conduit 102 by means of pump 104. From there it is directed to an accumulator 105 and a servo valve 106 which selectively opens and closes access to conduits 108 and 110. Conduit 108 leads to a chamber 112 on one side of a piston head 114 while conduit 110 leads to a chamber 116 on the opposite side of the piston head 114. The ram 118 is carried on a piston 120 which terminates in the piston head 114. Return conduit 122 selectively communicates with chamber 112 through valve 106 to return hydraulic fluid to the reservoir 100. Return conduit 122 also selectively communicates with chamber 116 through valve 106 to return fluid from chamber 116 to the reservoir 100. A control 130 having input from a position feedback device 132 is provided to operate valve 106 and to effect vertical movement of the ram 118.

For example, when it is desired to have the ram 118 descend, control 130 operates valve 106 to direct hydraulic fluid under pressure through conduit 110 and to permit hydraulic fluid to flow from chamber 112 through conduits 108 and 122 to be returned to the reservoir 100. The control 130 can modify the degree to which valve 106 provides communication to conduit 110 to thereby adjust the speed of movement of the ram 118. When it is desired to have the ram move upward, the positions of valve 106 is changed such that communication through the valve from the reservoir 100 to conduit 108 is effected while communication is also effected from conduit 110 through valve 106 into conduit 122.

Thus, by means of use of a hydraulically operated ram (as opposed to a mechanically operated ram) the direction of movement and the speed of movement can be precisely controlled by operation of the servo valve 106. Of course, instead of having a single valve as shown, separate valves may be provided in conduits 110 and 108 as well as in conduits 122 and 102, or other conduit arrangements can be made to effect the same operation.

Figure 3:
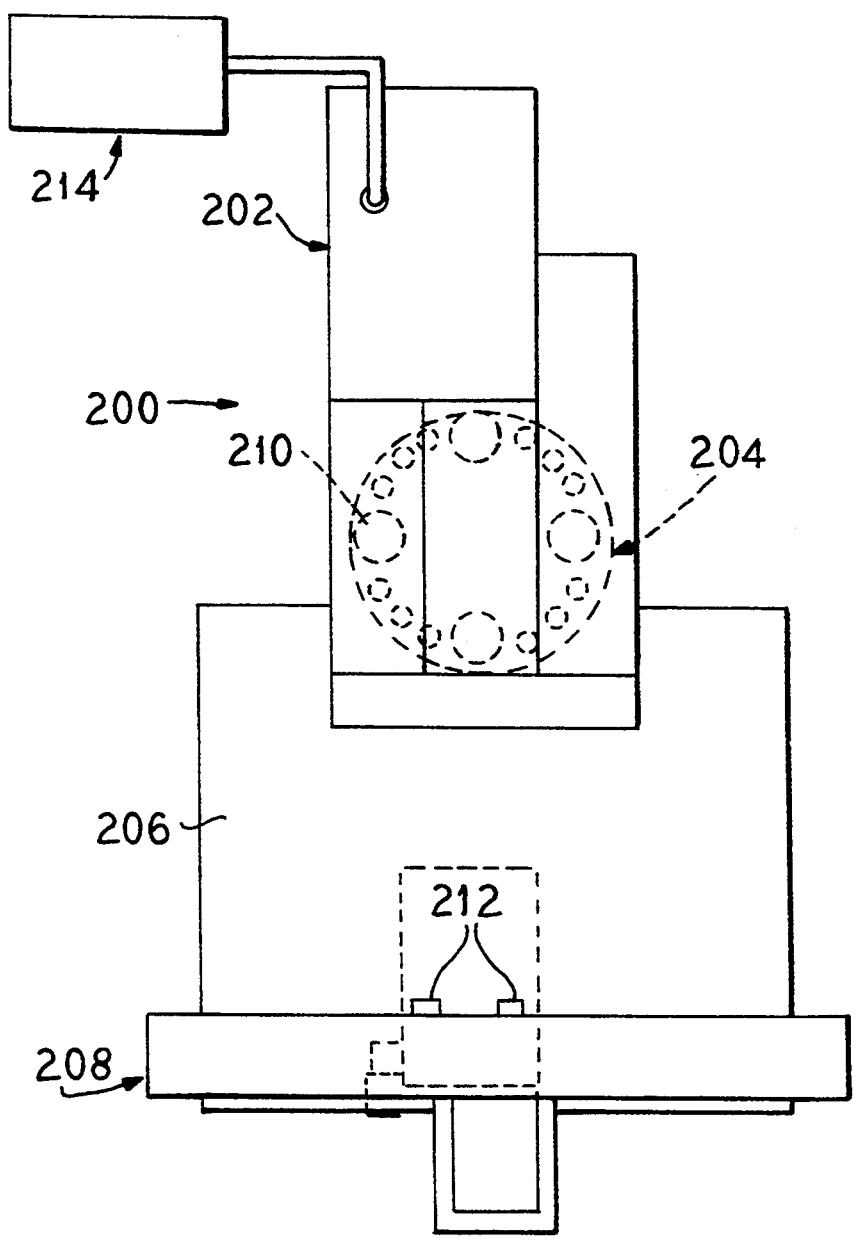
FIG. 3 illustrates a plan view of a turret punch press embodying the features of the present invention.

As illustrated in FIG. 3, a punch press 200 includes a frame 202 upon which are supported a rotatable turret assembly 204, a worktable 206 and a positioning carriage 208. The turret assembly 204 includes a plurality of tool stations 210, each adapted to receive a respective punch or other tool (not shown). The turret assembly 204 is used to bring respective punches and dies into alignment at a work station. Sheet clamps 212 hold a sheet provided on the positioning carriage 208. The positioning carriage 208 and the sheet clamps, or grippers 212 in combination are provided for moving the sheet in both the X and Y directions. The positioning carriage 208, sheet clamps 212, and panel press 200 are all controlled by CNC system 214.

Figure 4:
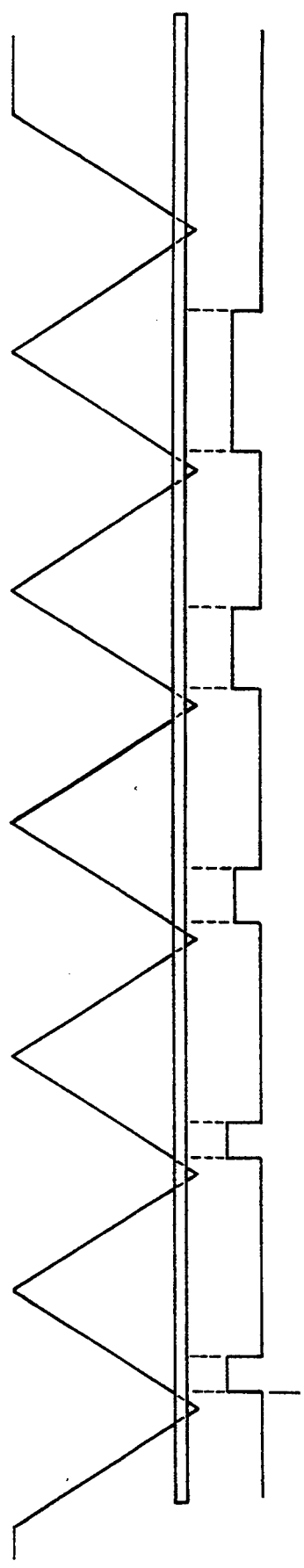
FIG. 4 is a graph illustrating known punch strokes.

As illustrated in FIG. 4, the standard punch stroke involves selecting a fixed position, or hover height, for a ram above the sheet. The ram parameters are determined solely on the basis of the thickness of the sheet. The ram moves quickly from the hover height, until the punching tool strikes and passes through the sheet, thereby performing its operation. As the sheet material is moved to another position, the ram quickly returns to its hover height. Unfortunately, as the sheet can be warped, the hover height is often chosen to be higher above the surface of the sheet in order to avoid frequently changing the hover height.

Figure 5:
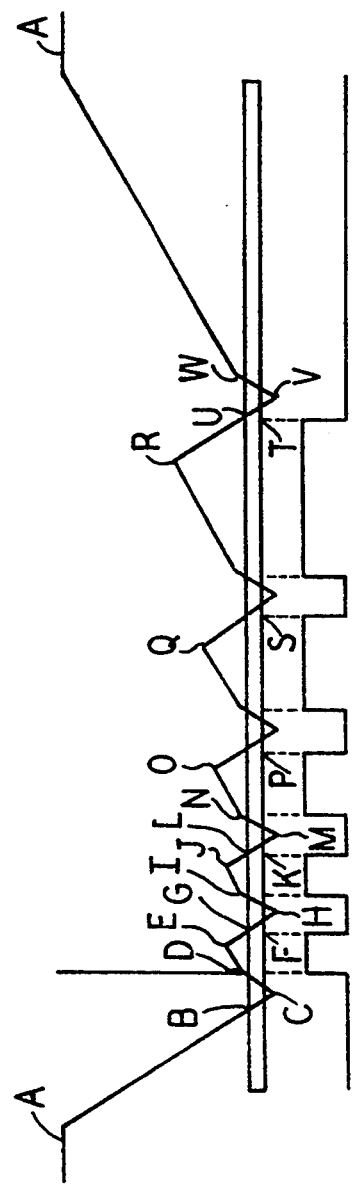
FIG. 5 is a graph illustrating punch strokes achieved in accordance with the principles of the present invention.

As illustrated in FIG. 5, a method of controlling punch strokes of a ram in accordance with the principles of the present invention involves automatically adjusting the height from which a punch operation is initiated based on the distance a sheet is moved.

Specifically, prior to performing any punching operations, the punching tool is positioned at the programmed maximum hover height A. A punching operation is initiated at A by control 130 operating valve 106 to direct hydraulic fluid under pressure through conduit 110 and to permit hydraulic fluid to flow from chamber 112 through conduits 108 and 122 to be returned to the reservoir 100, as illustrated in FIG. 2. The control 130 can modify the degree to which valve 106 provides communication to conduit 110 to adjust the speed of movement of the ram 118. A punching operation from point B to C and from point C to D is then performed. From point B to C, the ram undergoes a high speed downstroke. When the ram reaches a bottom of the downstroke at C, the position of valves 106 is reversed such that communication through the valve from the reservoir 100 to conduit 108 is affected while communication is also affected from conduit 110 through valve 106 into conduit 122, as illustrated in FIG. 2. In this manner, a high speed upstroke of the ram is achieved.

Once the punching tool clears the sheet at D, at least one of the carriage and the sheet clamps begin moving the sheet to a preselected position F, the ram undergoes a low speed upstroke from D to E. E is a variable hover height selected based on the distance the sheet must travel to reach position F. The punching tool and the ram continue the low speed upstroke (where the speed of the upstroke can be adjusted as discussed with reference to FIG. 2), until either the variable hover height E is reached or until the sheet reaches position F. The next punching operation is then initiated at E, and the ram descends from E to G with either a high or low speed movement. A punching operation from point G to H and from point H to I is then performed in a similar manner as the punching operation from point B to C and from point C to D, as discussed above. The ram then undergoes a low speed upstroke from I to J. J is a variable hover height selected based on the distance the sheet must travel to reach position K.

A hover time, during which the punching tool remains at one of the selected variable hover heights depends on both the speed of the upstroke of the ram from an upper surface of the sheet to a selected variable hover height and the time it takes the sheet to move to the next preselected position. For example, if the speed of the upstroke from I to J is greater than the speed of the upstroke from D to E, then the hover time at J will be longer than the hover time at E, since the sheet takes the same amount of time to move the equivalent distances to F and K.

The descent of the ram, the punching operation, and the subsequent low speed upstroke of the ram are then repeated from J to L, L to M, M to N and N to O, as described above. However, as the distance the sheet moves to reach P is greater than the distance the sheet moves to reach E or J, the hover height O is higher than hover heights E and J. Again, the hover time can be varied based on the speed of the upstroke from N to O. Further, the selected hover height can also be adjusted by either increasing the speed of the upstroke from N to O or by decreasing the speed of the upstroke from N to O. In addition, if the sheet reaches P before the tool reaches the hover height at O, the ram reverses direction (as discussed with reference to FIG. 2) and the punching operation is initiated, Thus, if the sheet reaches P before the tool reaches the hover height O then the punching operation is initiated before the tool reaches O.

Further, the hover height at Q and R, is higher above an upper surface of the sheet than hover heights E, J and O, as the distance the sheet travels to reach S and T is greater than the distance the sheet travels to reach F, K and P. Thus, the greater the distance the sheet travels to each a selected position, the higher the variable hover height is above the upper surface of the sheet.

Finally, following the punching operation from U to V and from V to W, the punching tool and the ram retract to the maximum hover height A, where either no further punching operations are to be performed, the punching tool is to be changed, or where the distance the sheet travels is sufficiently long that the maximum hover height is selected as the variable hover height based on the distance moved.

Thus, in accordance with the principles of the present invention, the downstroke of the ram for each punching operation is initiated by looking ahead to the distance the sheet moves. The downstroke of the ram begins before the sheet reaches a selected position or before the tool reaches a selected hover height if the sheet is in position. The punching operation is then performed when the sheet reaches the selected position. It is also contemplated that the speed of the downstroke of the ram from E to G, ETC., can be varied. The downstroke of the ram can be initiated from a lower variable hover height where the speed of the ram is increased as it approaches the upper surface of the sheet.

Figure 6:
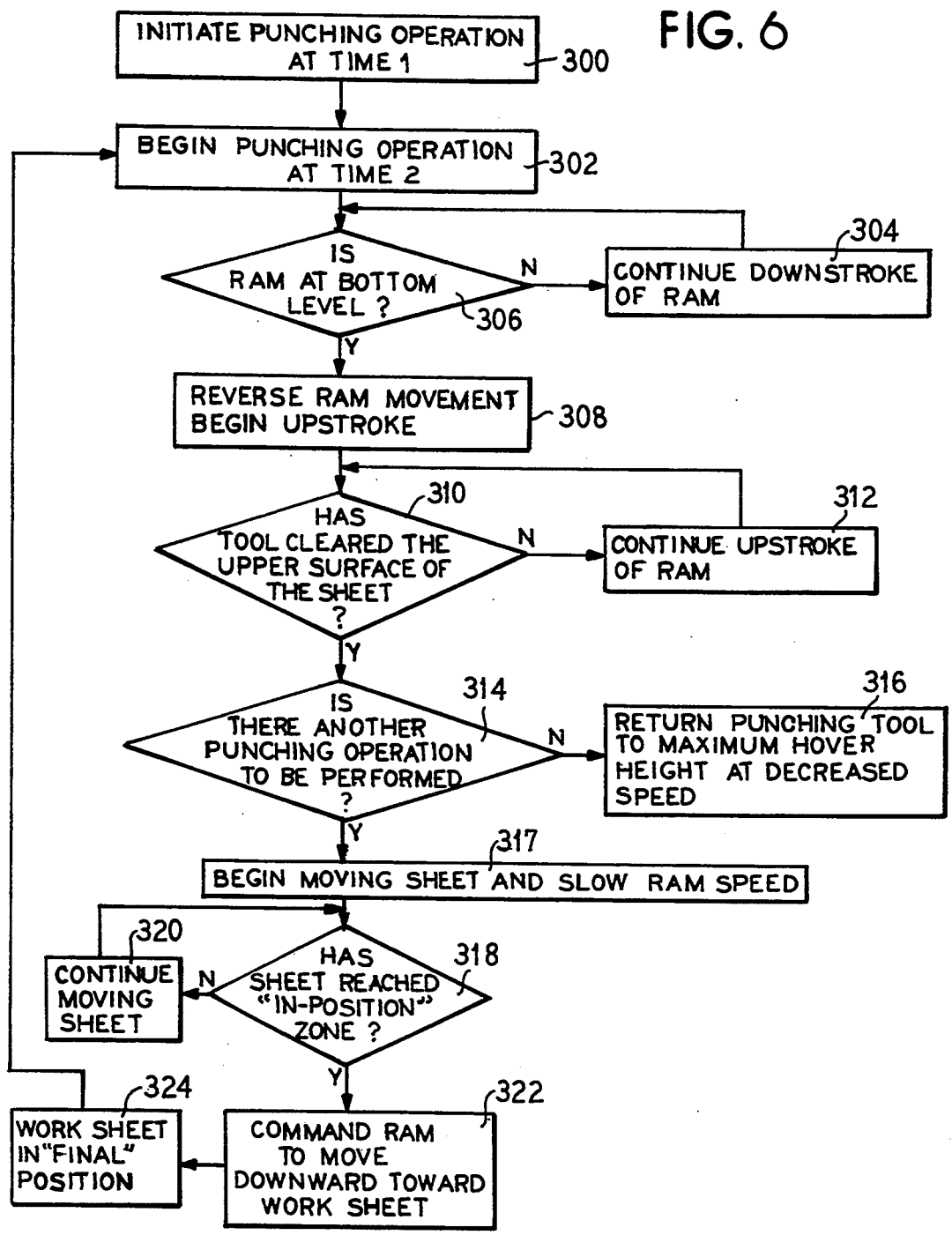
FIG. 6 is a flow diagram illustrating the control loop for varying punch strokes in accordance with the principles of the present invention.

As illustrated in FIG. 6, the control loop for varying punch strokes in accordance with the principles of the present invention involves initiating a punching operation at 300 by initiating a downstroke of a ram. The punching operation is then performed (302) by continuing a downstroke (304) of the tool through the sheet until a bottom level, such as C, H, M, etc., illustrated in FIG. 5, is reached (306). The direction of the ram is then reversed (308), as described with reference to FIG. 2 above, and an upstroke of the ram begins. If the punching tool is not above the upper surface of the sheet (310), movement of the ram is continued with a high speed upstroke (312) until the ram clears the upper surface of the sheet (310). Once the punching tool clears the upper surface of the sheet, it is determined whether another punching operation is to be performed (314). If there are no further punching operations to be performed, the tool is returned to its maximum hover height at a slowed speed (316).

If there is another operation performed with the same punch tool, the ram slows when it clears the top of the material sheet and movement of the material sheet is begun (317). The sheet continues to be moved toward an "inposition" zone (318, 320). The ram continues moving up at this slow speed until the material reaches the "in-position" zone (320) and the ram controller is issued a punch signal by the NC control (322) at which time the ram direction is reversed downward and approaches the material to execute the next punching operation. The punch signal is timed by the NC control so that the punch is just above the top of the material when the sheet material reaches its next, "final" position (324). Once the sheet has reached the "final" position (324) the punch tool will begin its penetration of the sheet (302) and the cycle will be repeated. In this manner optimal timing between the punching operation and the travel of the sheet is achieved.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim:

1. A method for controlling punch strokes of a vertically movable ram in a punch press machine having means for automatically moving a sheet of material to be punched comprising the steps of:
   performing a first punching operation comprising vertically reciprocating the ram with a sheet in a first preselected position;
   moving the sheet to a second preselected position;
   selecting a hover height for the ram based on the distance between the first preselected position and the second preselected position before the sheet reaches the second preselected position; and
   initiating downward movement of the ram to perform a second punching operation before the sheet reaches the second preselected position by initiating the second punching operation from the selected hover height of the ram.

2. A method as claimed in claim 1, wherein the step of performing a first punching operation is further defined by punching the sheet with a punching tool acted upon by the ram, where the punching tool first passes through the sheet with a high speed downstroke, reverses direction when it reaches a bottom of the downstroke, and then is withdrawn from the sheet with a high speed upstroke.

3. A method as claimed in claim 2, further comprising the step of initiating the second punching operation when the punching tool reaches the selected hover height.

4. A method as claimed in claim 1, further comprising the step of retracting a punching tool secured to the ram from an upper surface of the sheet at a decreased speed after the first punching operation is completed, wherein the first punching operation is completed once the punching tool secured to the ram clears the upper surface of the sheet on an upstroke of the ram.

5. A method as claimed in claim 1, where the speed of a downstroke of the ram is variable.

6. A method for controlling punch strokes of a vertically moveable ram in a punch press machine having means for automatically moving a sheet of material to be punched comprising the steps of:
   performing a first punching operation with a sheet in a first position;
   moving the sheet to a second position;
   selecting a hover height based on the distance between the first position and the second position before the sheet reaches the second position; and
   initiating downward movement of the ram to perform a second punching operation from the selected hover height before the sheet reaches the second position.

7. A method as claimed in claim 6, wherein the step of performing the first punching operation is further defined by punching the sheet with a punching tool acted upon by the ram where the punching tool first passes through the sheet with a high speed downstroke, reverses direction when it reaches a bottom of the downstroke, and then is withdrawn from the sheet with a high speed upstroke.

8. A method as claimed in claim 6, including the additional steps of:
   moving the sheet to a third position which is a distance from said second position different then the distance between the first position and the second position;
   selecting a second hover height based on the distance between the second position and the third position before the sheet reaches the third position;
   initiating downward movement of the ram to perform a third punching operation from the second selected hover height before the sheet reaches the third position, wherein the second hover height is greater than the hover height selected for the second punching operation if the distance between the second and third positions is greater than the distance between the first and second positions and the second hover height is less than the hover height selected for the second punching operation if the distance between the second and third positions is less than the distance between the first and second positions.

9. A method as claimed in claim 6, further comprising the step of retracting a punching tool secured to the ram from an upper surface of the sheet at a decreased speed after the first punching operation is completed, wherein the first punching operation is completed once the punching tool secured to the ram clears the upper surface of the sheet on an upstroke of the ram.

10. A method as claimed in claim 6, where the speed of a downstroke of the ram is variable.

11. A method as claimed in claim 6, further comprising the step of equipping the ram with at least one servo controlled valve to control movement of the ram along a vertical plane of the punch press machine.

12. A method as claimed in claim 11, further comprising the step of providing a computer control for controlling the at least one servo valve.

13. A method as claimed in claim 6, wherein the step of performing a first punching operation is further defined by piercing a punch coupled to the ram through the sheet, reversing movement of the ram once the punch reaches a bottom of the downward movement below the sheet, and withdrawing the punch from the sheet until the punch clears the upper surface of the sheet.

14. A method of controlling stroke movement of a punch press machine having a hydraulic powered ram which comprises:

arranging a workpiece supported on a work table so that the hydraulic powered ram is movable in opposite directions toward and away from the work table supported workpiece; equipping the ram with at least one servo controlled valve to control movement of the ram in both directions;

providing a computer control for controlling the at least one servo valve;

providing a workpiece movement device for moving the workpiece on the work table to present preselected portions of the work to a work station aligned with the ram;

coupling a punch to the ram;

initiating a punching stroke by causing movement of the ram towards the workpiece to engage the workpiece by the punch;

continuing movement of the ram;

piercing the punch through the workpiece;

thereafter reversing movement of the ram to initiate withdrawal of the punch from the workpiece;

determining clearance of the withdrawing punch from the workpiece and upon such determination initiating movement of the workpiece on the work table to present the next preselected portion of the workpiece to the work station;

continuing raising movement of the ram during movement of the work piece;

determining the distance for movement of the workpiece to present the next preselected portion to the work station;

determining a hover height for the ram based upon the distance for movement of the workpiece;

initiating ram downstroke when the ram is at the determined hover height.

15. The method of claim 14, wherein ram movement speed is decreased after punch clearance from the workpiece.

* * * * *